US012612192B2

(12) United States Patent
Cheng et al.

(10) Patent No.: US 12,612,192 B2
(45) Date of Patent: Apr. 28, 2026

(54) ROBOTIC BEES AND MANTIS AND INSECT-LIKE ROBOTS WITH EMBODIED ARTIFICIAL INTELLIGENCE

(71) Applicant: General Cybernation Group Inc., Rancho Cordova, CA (US)

(72) Inventors: George Shu-Xing Cheng, Folsom, CA (US); Manuel Martinez, North Highlands, CA (US)

(73) Assignee: General Cybernation Group Inc., Rancho Cordova, CA (US)

( * ) Notice: Subject to any disclaimer, the term of this patent is extended or adjusted under 35 U.S.C. 154(b) by 156 days.

(21) Appl. No.: 18/752,424

(22) Filed: Jun. 24, 2024

(65) Prior Publication Data

US 2025/0388348 A1 Dec. 25, 2025

(51) Int. Cl.
*B64U 10/40* (2023.01)
*A01G 7/06* (2006.01)
(Continued)

(52) U.S. Cl.
CPC .............. *B64U 10/40* (2023.01); *A01M 5/02* (2013.01); *G05D 1/243* (2024.01); *G05D 1/248* (2024.01); *G05D 1/622* (2024.01); *G05D 1/644* (2024.01); *G05D 1/661* (2024.01); *A01G 7/06* (2013.01); *A01G 13/10* (2013.01); *B64U 2101/40* (2023.01); *B64U 2201/10* (2023.01); *G05D 2101/15* (2024.01); *G05D 2105/80* (2024.01); *G05D 2107/21* (2024.01); *G05D 2109/265* (2024.01)

(58) Field of Classification Search
CPC ............... B64U 10/40; B64U 2101/40; B64U 2201/10; G05D 1/243; G05D 1/248; G05D 1/622; G05D 1/644; G05D 1/661; G05D 2101/15; G05D 2105/80; G05D 2107/21; G05D 2109/265; A01G 7/06; A01G 13/10; A01M 5/02
See application file for complete search history.

(56) References Cited

U.S. PATENT DOCUMENTS 4,826,729 A * 5/1989 Kitamura ............. A01G 9/1438
524/413
5,353,542 A * 10/1994 Vaudry ................. A01M 1/145
43/107
(Continued)

*Primary Examiner* — Bhavesh V Amin
(74) *Attorney, Agent, or Firm* — DLA PIPER LLP US

(57) ABSTRACT

This invention relates to insect-like robots empowered by generative artificial intelligence (Gen-AI), specifically designed to address critical challenges in agriculture and environmental monitoring. The robotic bee, mantis, and dragonfly can autonomously perform essential tasks such as crop pollination, pest control, and detailed farmland inspection. These robots feature lifelike designs with components such as heads with integrated high-resolution cameras, antennae for communication, specialized mouthparts, thoraxes housing CPUs and actuators, and wings with thin-film photovoltaic solar materials. The AI models function as the brains, processing data captured by various sensors to provide real-time guidance and control commands. Leveraging advanced technologies and sustainable power sources, these robotic insect-like robots enhance productivity, sustainability, and efficiency in agricultural practices, contributing to a more secure and eco-friendly future.

20 Claims, 7 Drawing Sheets

(51) Int. Cl.

| | |
|---|---|
| *A01G 13/10* | (2006.01) |
| *A01M 5/02* | (2006.01) |
| *B64U 101/40* | (2023.01) |
| *G05D 1/243* | (2024.01) |
| *G05D 1/248* | (2024.01) |
| *G05D 1/622* | (2024.01) |
| *G05D 1/644* | (2024.01) |
| *G05D 1/661* | (2024.01) |
| *G05D 101/15* | (2024.01) |
| *G05D 105/80* | (2024.01) |
| *G05D 107/20* | (2024.01) |
| *G05D 109/20* | (2024.01) |

(56) References Cited

U.S. PATENT DOCUMENTS

| | | | | |
|---|---|---|---|---|
| 5,607,711 | A * | 3/1997 | Lagunas-Solar | A61L 2/10 426/248 |
| 5,915,948 | A * | 6/1999 | Kunze | A01M 1/145 43/113 |
| 6,274,137 | B1 * | 8/2001 | Mensah | A01N 63/32 504/117 |
| 8,319,649 | B1 * | 11/2012 | Devane | A01M 1/026 340/552 |
| 8,844,192 | B2 * | 9/2014 | Yamada | A01M 1/08 43/107 |
| 10,017,248 | B2 * | 7/2018 | Samuel | B64C 33/02 |
| 10,023,307 | B2 * | 7/2018 | Deng | B64U 50/19 |
| 10,080,357 | B2 * | 9/2018 | Uchida | A01M 1/145 |
| 10,485,228 | B2 * | 11/2019 | Itano | A01M 1/2077 |
| 10,577,103 | B2 * | 3/2020 | Cantrell | G05D 1/0011 |
| 10,674,685 | B2 * | 6/2020 | Caldeira | A01H 1/027 |
| 10,752,378 | B2 * | 8/2020 | Wilkins | H04N 23/951 |
| 11,395,464 | B2 * | 7/2022 | Ajamian | B64U 10/40 |
| 11,517,007 | B2 * | 12/2022 | Hachiya | A01G 7/045 |
| 12,022,820 | B1 * | 7/2024 | Zhang | A01M 1/04 |
| 12,310,351 | B1 * | 5/2025 | Lucas | A01M 3/005 |
| 2001/0024646 | A1 * | 9/2001 | Mensah | A01N 63/32 424/93.51 |
| 2008/0141578 | A1 * | 6/2008 | Chen | A01M 1/02 43/132.1 |
| 2010/0229459 | A1 * | 9/2010 | Simchoni-Barak | A01N 31/02 43/112 |
| 2012/0115390 | A1 * | 5/2012 | Fuchiwaki | B64U 10/40 446/35 |
| 2012/0292438 | A1 * | 11/2012 | Sreetharan | B64U 10/40 74/108 |
| 2016/0000059 | A1 * | 1/2016 | Kondo | A01K 29/00 43/121 |
| 2016/0159477 | A1 * | 6/2016 | Deng | B64C 33/02 244/22 |
| 2016/0242401 | A1 * | 8/2016 | Johnston | A01M 1/14 |
| 2016/0353661 | A1 * | 12/2016 | Caldeira | A01H 1/027 |
| 2018/0065749 | A1 * | 3/2018 | Cantrell | B64D 1/22 |
| 2018/0184652 | A1 * | 7/2018 | Walse | A01N 37/02 |
| 2019/0023392 | A1 * | 1/2019 | Micros | B64U 80/82 |
| 2019/0183077 | A1 * | 6/2019 | Ajamian | G05D 1/12 |
| 2019/0216093 | A1 * | 7/2019 | Martinez | A61P 31/04 |
| 2020/0170245 | A1 * | 6/2020 | Cheramie | A01N 57/20 |
| 2020/0281138 | A1 * | 9/2020 | Chen | B64U 10/80 |
| 2021/0076657 | A1 * | 3/2021 | Witasek | A01M 1/04 |
| 2021/0259231 | A1 * | 8/2021 | Akiba | A01M 1/103 |
| 2022/0187847 | A1 * | 6/2022 | Cella | G05B 19/41885 |
| 2022/0197306 | A1 * | 6/2022 | Cella | G06Q 10/06311 |
| 2023/0083724 | A1 * | 3/2023 | Cella | G06F 16/24537 705/28 |
| 2023/0098602 | A1 * | 3/2023 | Cella | B25J 9/1674 700/248 |
| 2023/0102048 | A1 * | 3/2023 | Cella | G06N 10/80 700/248 |
| 2023/0123322 | A1 * | 4/2023 | Cella | G05B 23/0283 700/29 |
| 2023/0219230 | A1 * | 7/2023 | Cella | B25J 9/1682 700/248 |
| 2023/0222531 | A1 * | 7/2023 | Cella | B25J 9/1682 705/7.31 |
| 2024/0196885 | A1 * | 6/2024 | Skillman | A01P 19/00 |
| 2024/0415078 | A1 * | 12/2024 | Gelin | B64D 1/22 |
| 2025/0011017 | A1 * | 1/2025 | Kim | B64U 50/19 |
| 2025/0143236 | A1 * | 5/2025 | Andersson | A01G 23/0955 |
| 2025/0185660 | A1 * | 6/2025 | Ali | A01N 43/60 |
| 2025/0194577 | A1 * | 6/2025 | Okpala-Ezechukwu | A01M 1/023 |

* cited by examiner

30

ROBOTIC BEES AND MANTIS AND INSECT-LIKE ROBOTS WITH EMBODIED ARTIFICIAL INTELLIGENCE

INVENTION

The subject of this patent relates to embodied artificial intelligence, robots, guidance and control, and precision agriculture.

Precision Agriculture is an advanced farming practice that uses technology and data analysis to optimize agricultural production. By leveraging tools such as GPS, sensors, drones, and robotics, precision agriculture allows farmers to monitor and manage their fields with exceptional accuracy. This approach involves collecting real-time data on soil conditions, crop health, weather patterns, and pest activity, enabling farmers to make informed decisions and apply precise interventions tailored to specific areas of their fields.

Implementing precision agriculture can lead to significant cost savings, particularly in pest control, as farmers can target pest hotspots directly, reducing the need for widespread pesticide applications. This targeted approach not only cuts down on chemical usage but also promotes the cultivation of organic crops, which are increasingly in demand for their health and environmental benefits. By ensuring that interventions such as watering, fertilization, and pest control are only applied where needed, precision agriculture enhances crop yields, conserves resources, and minimizes environmental impact. This sustainable farming method supports higher productivity and profitability while promoting eco-friendly practices, making it a crucial innovation for the future of agriculture.

An insect-like robot is an advanced micro-size machine designed to resemble and mimic the structure and functionality of insects, including bees, mantises, and dragonflies. The advancement of large language model (LLM) and generative artificial intelligence (Gen-AI) makes it feasible to train an insect-like robot to perform certain tasks with videos, images, and text. Such robots can be developed with embodied AI to fly and achieve tasks such as pollination in agriculture fields, environmental monitoring, pest control, and crop health monitoring. In this patent, we describe innovative insect-like robots with embodied artificial intelligence.

Figure 1:
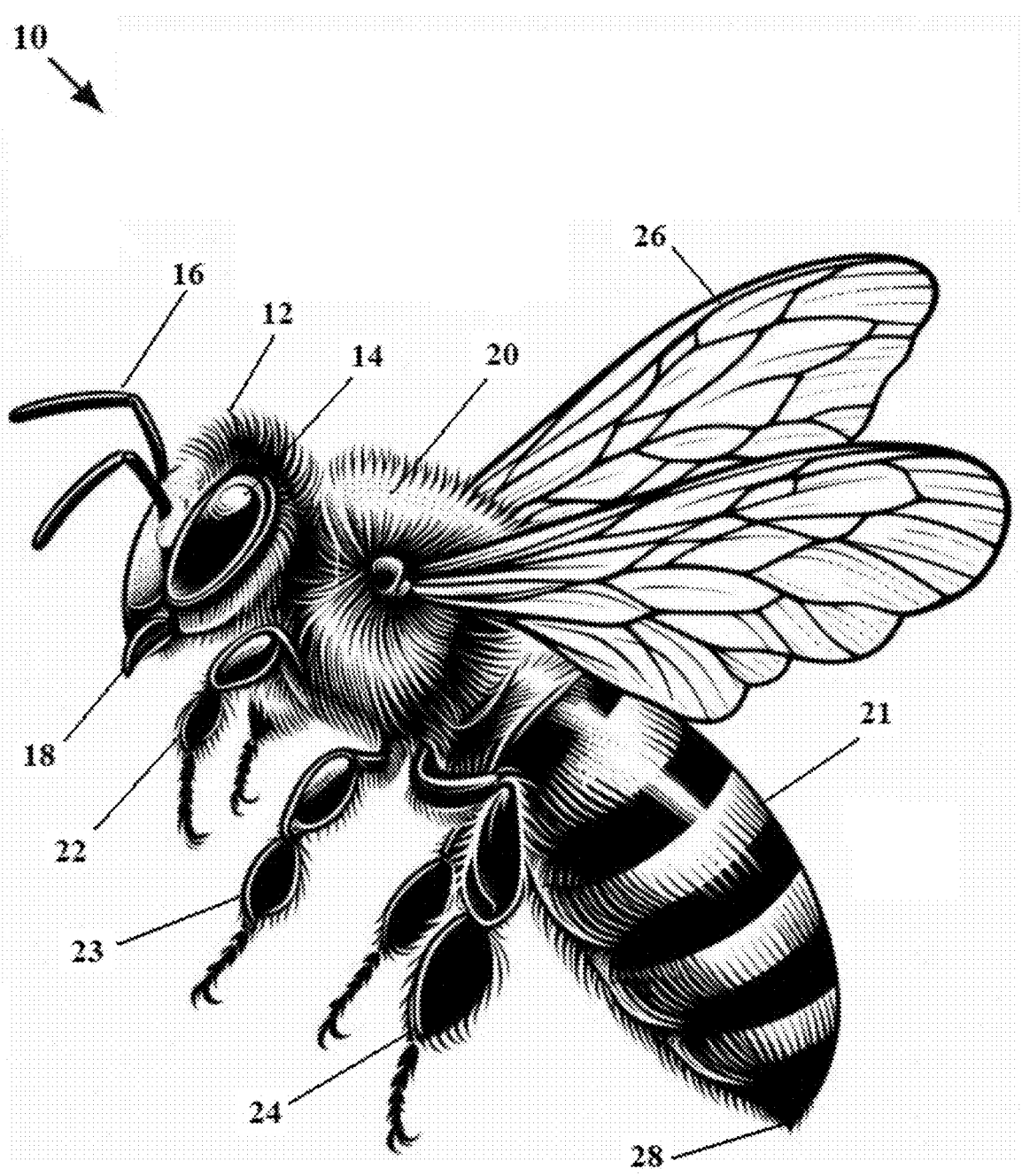
FIG. 1 is a perspective view of a bee-like robot with all key components, according to an embodiment of this invention.

In this patent, the term "mechanism" is used to represent hardware, software, or any combination thereof. The term "process" is used to represent a physical system or process with inputs and outputs that have dynamic relationships. The term "AI" means artificial intelligence. The term "LLM" means large language model. The term "SLM" means small language model. The term "Gen-AI" means generative AI. The term "GPT" means generative pre-trained transformer. The term "transformer" means a form of artificial neural network model used in generative artificial intelligence. The term "insect-like robot" means a robot that looks and behaves like an insect. The term "bee-like robot" means a robot that looks and behaves like a bee. The term "mantis-like robot" means a robot that looks and behaves like a mantis. The term "dragonfly-like robot" means a robot that looks and behaves like a dragonfly. The term "robot" or "robotic" refers to a machine resembling a human being, animal, bird, fish, or insect, capable of replicating certain movements and functions of a human being or other creatures, automatically. The term "a robotic bee" or "a bee robot" means a bee-like robot. The term "a robotic mantis" or "a mantis robot" means a mantis-like robot. The term "a robotic dragonfly" or "a dragonfly robot" means a dragonfly-like robot. The term "a robotic insect" or "an insect robot" means an insect-like robot. The term GPS means Global Positioning System that provides positioning, navigation, and timing services. The term "computing processing unit" or "CPU" means a microprocessor, microcontroller, micro-control unit, or any integrated circuit capable of performing computation and executing software programs and control algorithms.

Without losing generality, a robotic bee or a bee-like robot can also mean a robotic insect or insect-like robot, and vice versa. All numerical values given in this patent are examples. Other values can be used without departing from the spirit or scope of this invention. The description of specific embodiments herein is for demonstration purposes and in no way limits the scope of this disclosure to exclude other not specifically described embodiments of this invention.

DESCRIPTION

A. Robotic Bees for Agriculture Pollination

Agricultural pollination is a critical process for the production of many crops, relying heavily on natural pollinators such as bees. However, the global decline in bee populations due to factors such as habitat loss, pesticides, diseases, and climate change has posed a significant threat to food security. This decline has led to reduced crop yields and increased costs for farmers, who must find alternative pollination methods to ensure the productivity and quality of their crops. Traditional methods such as manual pollination are labor-intensive, costly, and often inefficient, especially for large-scale agricultural operations.

A robotic bee is a bee-like robot, designed with advanced embodied artificial intelligence that offers an effective solution for agriculture pollination at scale.

FIG. 1 is a perspective view of a bee-like robot with all key components, according to an embodiment of this invention. The robotic bee (10) comprises the following main components: A head (12), eyes (14), antennae (16), mouthparts (18), thorax (20), abdomen (21), forelegs (22), middle legs (23), hind legs (24), wings (26), and stinger (28). Each of these components are described in the following:

Head (12): Contains high-resolution micro cameras integrated with the eyes (14) for capturing visual data and aiding in navigation.

Antennae (16): Designed as a signal antenna for receiving and transmitting signals for communication.

Mouthparts (18): Used for tasks such as collecting samples, manipulating objects, and performing pollination.

Thorax (20) and Abdomen (21): House a small electronic circuit board with CPU, a battery, and sensors.

Forelegs (22): Equipped with actuators to enable walking, climbing, and gripping. Middle Legs (23): Provide stability and assist in locomotion.

Hind Legs (24): Facilitate movement and allow the robot to anchor itself for stability.

Wings (26): Include actuators for flapping, hovering, and controlled flight, and are made of thin-film photovoltaic solar materials to harvest solar power.

Stinger (28): Used for defense mechanisms or other specific tasks related to the robot's functions.

These components work together to enable the bee-like robot to perform its intended tasks efficiently, mimicking the behavior and capabilities of real bees in various agricultural and environmental scenarios.

Figure 2:
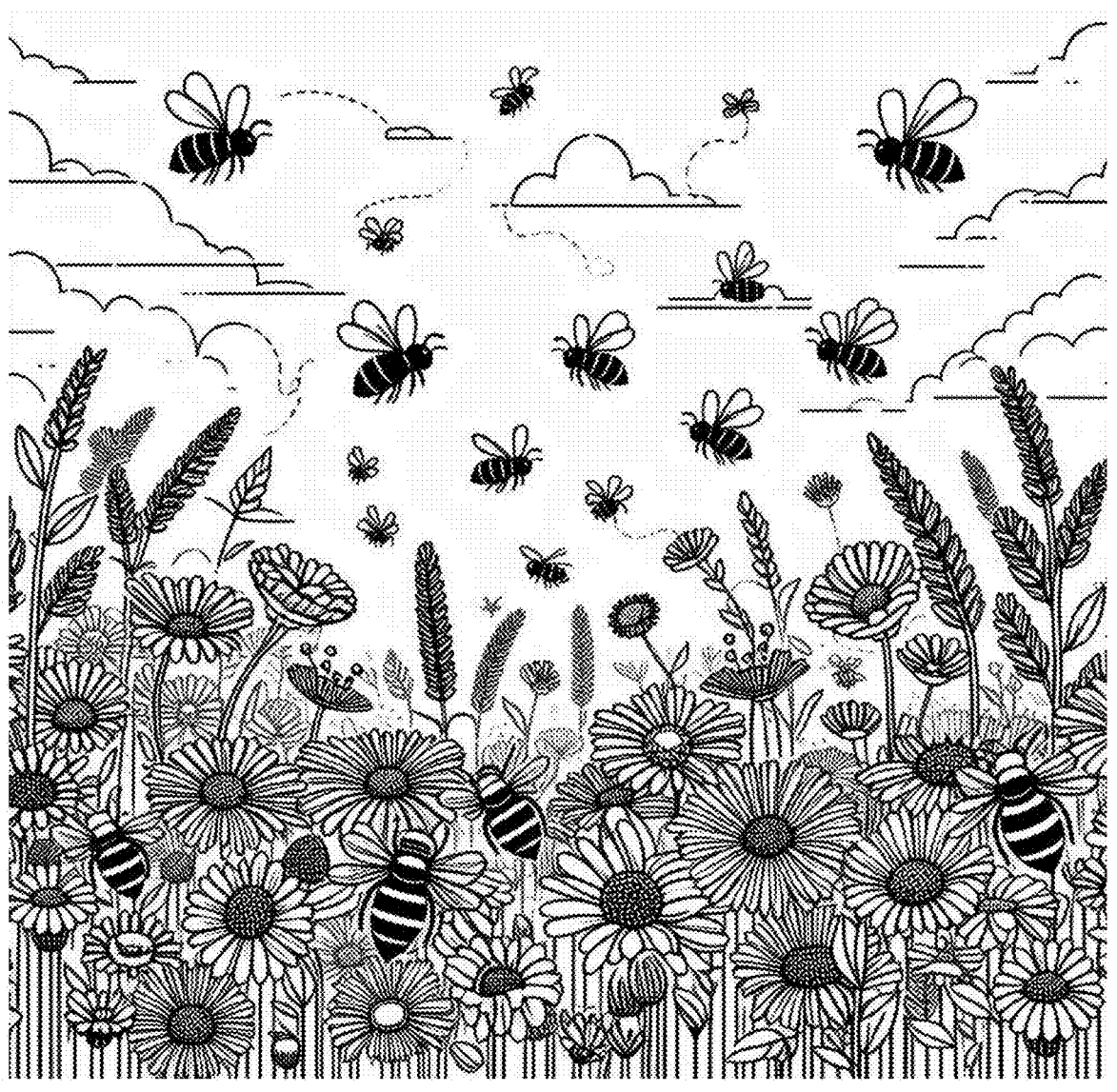
FIG. 2 is a perspective view of robotic bees flying in an agriculture field performing pollination, according to an embodiment of this invention.

FIG. 2 is a perspective view of robotic bees flying in an agriculture field performing pollination, according to an embodiment of this invention. FIG. 2 illustrates a number of robotic bees (10) in mid-flight, demonstrating their capabilities for agricultural pollination. These robotic bees are shown flying over an agricultural field, actively engaged in pollination activities. Each robotic bee utilizes its advanced sensory and actuator systems to identify and pollinate flowers accurately. The field includes a variety of flowering crops, which benefit from the precise and efficient pollination performed by the robotic bees. This environment represents a typical agricultural setting where natural pollinators are in decline, highlighting the importance of the robotic bees' role.

While the robotic bees are flying, their wings, made of thin-film photovoltaic solar materials, harvest solar energy to charge a micro-size battery inside the robotic bee. This feature ensures that the robotic bees have a sustainable power source, allowing them to operate for extended periods. The robotic bees are depicted hovering and landing on flowers, using their mouthparts (18) and body to transfer pollen, mimicking the natural behavior of real bees. This activity ensures effective cross-pollination, contributing to improved crop yields and quality. The bees autonomously navigate the field, avoiding obstacles and identifying target flowers with precision. Equipped with sensors and actuators, they perform precise pollination, ensuring each flower receives the necessary pollen. Designed to adapt to various environmental conditions, these robotic bees provide a scalable and reliable solution to the challenges posed by the decline in natural pollinator populations, enhancing the sustainability and productivity of agricultural practices.

B. Robotic Mantis for Agriculture Pest Control

Agriculture faces significant challenges due to the prevalence of pests, which can cause substantial damage to crops and reduce yields. Traditional pest control methods, such as chemical pesticides, pose risks to human health, the environment, and non-target species, including beneficial insects. Moreover, pests can develop resistance to these chemicals over time, rendering them less effective and necessitating the use of higher doses or alternative solutions. This situation creates a need for innovative and sustainable pest control methods that can effectively manage pest populations without harming the ecosystem or human health. The decline in natural predators due to habitat loss and environmental changes further exacerbates the problem, highlighting the urgency for advanced technological solutions to address this critical issue in modern agriculture.

The praying mantis is a natural predator renowned for its ability to effectively kill and control populations of bugs and worms. With its keen eyesight and quick reflexes, the mantis can swiftly capture and consume a wide variety of agricultural pests. This makes it an invaluable ally in pest management, helping to maintain healthy crop yields without the need for harmful chemical pesticides.

Figure 3:
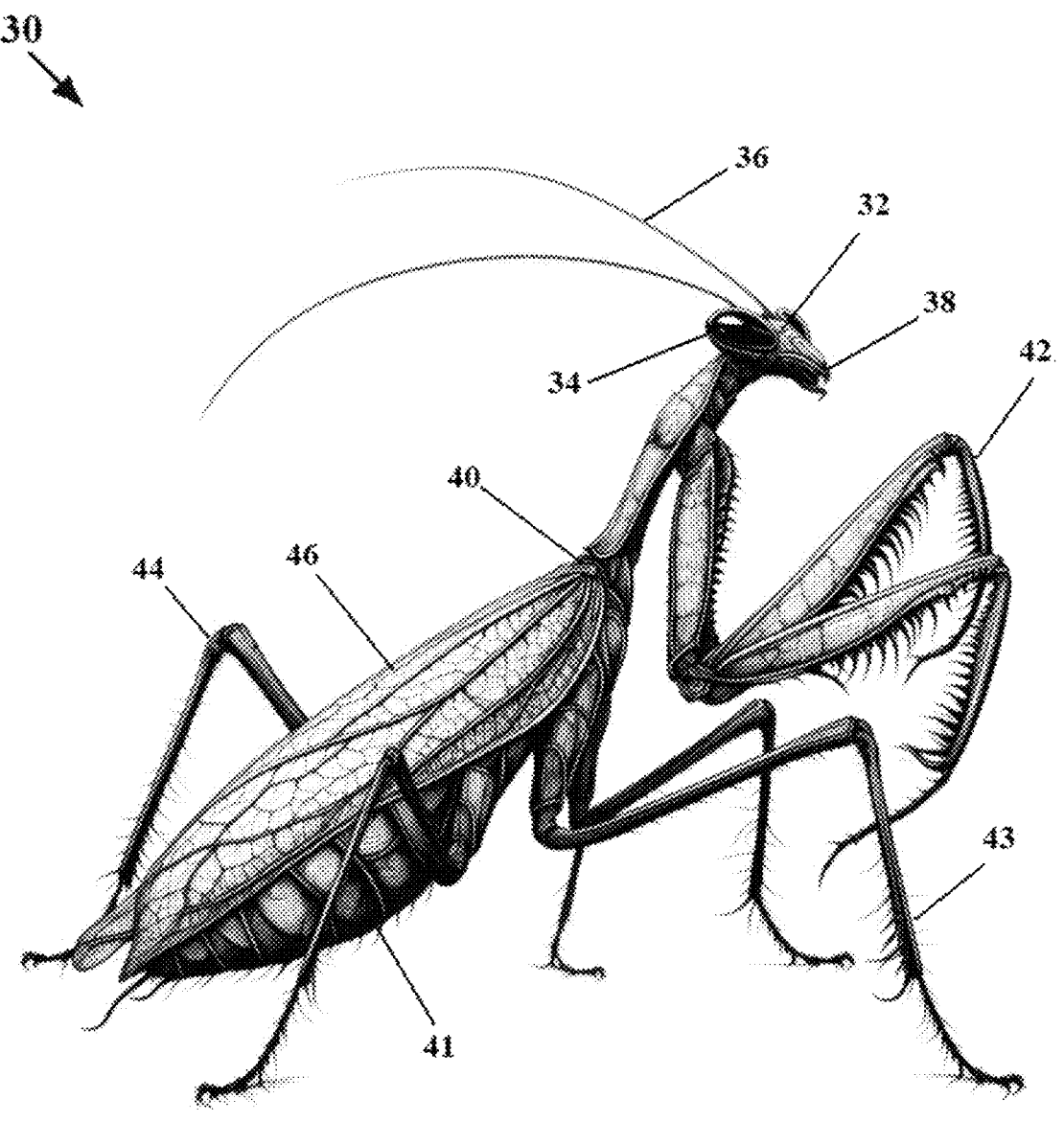
FIG. 3 is a perspective view of a mantis-like robot with all key components, according to an embodiment of this invention.

FIG. 3 is a perspective view of a mantis-like robot with all key components, according to an embodiment of this invention. The robotic mantis (30) comprises the following main components: A head (32), eyes (34), antennae (36), mouthparts (38), thorax (40), abdomen (41), raptorial forelegs (42), middle legs (43), hind legs (44), and wings (46). Each of these components are described in the following:

Head (32): Contains high-resolution micro cameras integrated with the eyes (34) for capturing visual data and aiding in navigation.

Antennae (36): Designed as a signal antenna for receiving and transmitting signals for communication.

Mouthparts (38): Used for tasks such as capturing and manipulating prey.

Thorax (40) and Abdomen (41): House a small electronic circuit board with CPU, battery, and sensors.

Raptorial Forelegs (42): Equipped with powerful actuators and claws for grasping and killing prey worms and bugs.

Middle Legs (43): Provide stability and assist in locomotion.

Hind Legs (44): Facilitate movement and allow the robot to anchor itself for stability.

Wings (46): Include actuators for controlled flight and hovering, and are made of thin-film photovoltaic solar materials to harvest solar power.

These components work together to enable the mantis-like robot to perform its intended tasks efficiently, mimicking the behavior and capabilities of real mantises in various agricultural and environmental scenarios.

Figure 4:
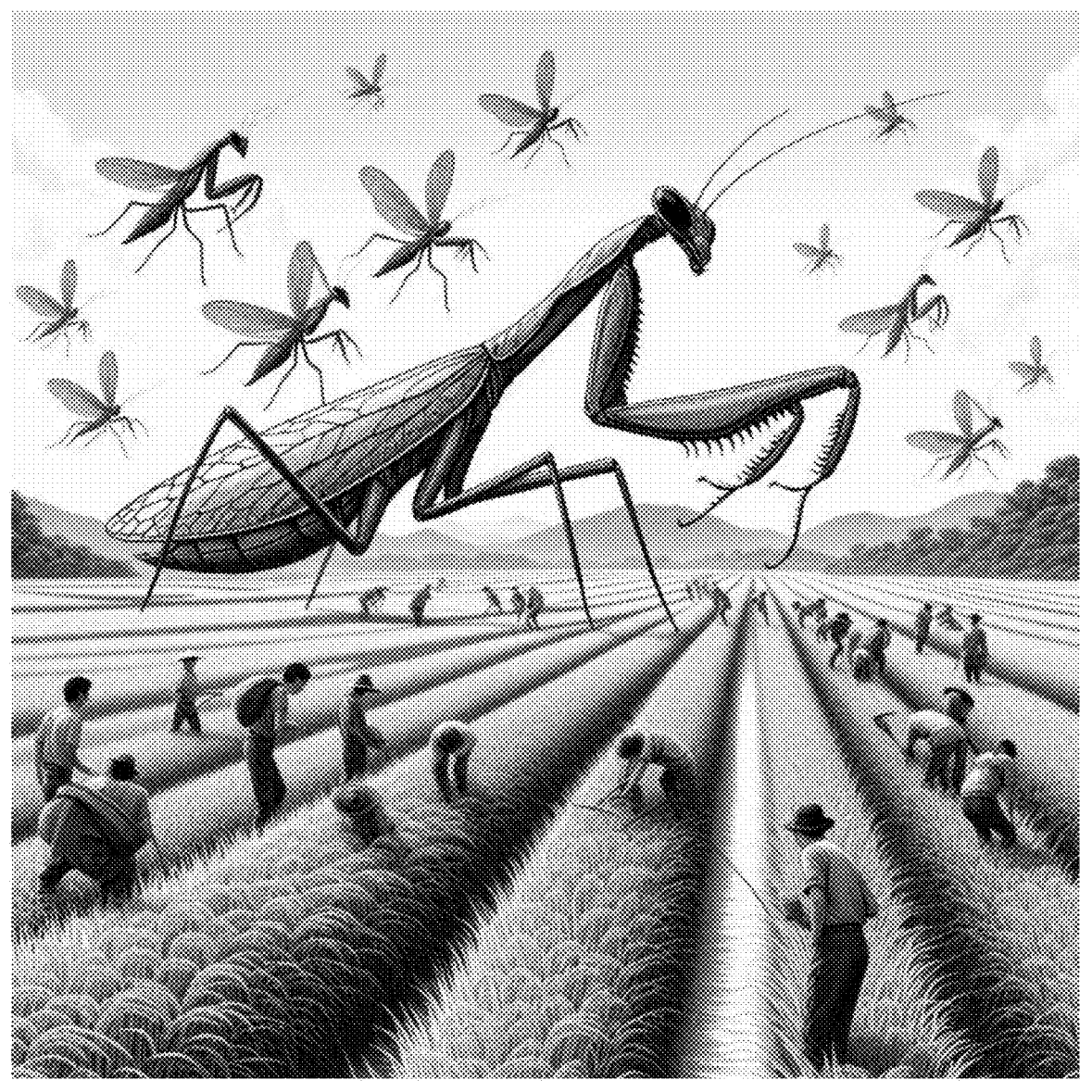
FIG. 4 is a perspective view of robotic mantis flying in an agriculture field killing worms and harmful insects such as locusts, according to an embodiment of this invention.

FIG. 4 is a perspective view of robotic mantises flying in an agriculture field killing worms and harmful insects such as locusts, according to an embodiment of this invention. FIG. 4 illustrates a number of robotic mantises (30) in mid-flight, showcasing their capabilities for agricultural pest control. These robotic mantises are depicted flying over an agricultural field, actively engaged in identifying and eliminating pests. Each mantis-like robot leverages its advanced sensory and actuator systems to locate and kill pests such as worms and harmful insects like locusts. The environment includes a variety of crops that benefit from the pest control activities performed by the robotic mantises, representing a typical agricultural setting where pest infestations pose a significant threat to crop health and yield.

The robotic mantises are shown using their raptorial forelegs (42) to grasp and kill pests, effectively mimicking the natural predatory behavior of real mantises. This activity ensures effective pest control, reducing crop damage and promoting healthier plant growth. The robotic mantises autonomously navigate the field, avoiding obstacles and precisely targeting harmful insects. Equipped with sensors and actuators, they perform precise pest control operations, ensuring that pests are efficiently eliminated. Additionally, while flying, the wings made of thin-film photovoltaic solar materials harvest solar energy to charge the micro-size batteries inside the robotic mantises, providing a sustainable power source for extended operations.

This innovative application of robotic mantises in agriculture offers a scalable and environmentally friendly solution to the challenges posed by pest infestations. By integrating advanced technologies and sustainable power sources, these robotic mantises enhance the productivity and sustainability of agricultural practices, reducing the reliance on chemical pesticides and mitigating their associated risks to human health and the environment.

C. Robotic Dragonflies for Farmland Inspection

Farmers face numerous challenges in managing and maintaining the health and productivity of their farmlands. Regular inspection of crops is essential for early detection of issues such as pest infestations, diseases, nutrient deficiencies, and water stress. However, traditional methods of farmland inspection can be labor-intensive, time-consuming, and often inefficient, especially for large-scale operations. Additionally, the need for timely and precise data to make informed decisions is critical in modern agriculture, where small delays or missed problems can lead to significant yield losses and economic impacts. Farmers require innovative solutions that provide real-time, accurate, and comprehensive data to optimize their crop management practices and enhance overall farm productivity.

Robotic dragonflies equipped with advanced sensors and imaging technologies can provide an efficient and effective solution for farmland inspection. These robotic dragonflies can autonomously navigate large fields, capturing high-resolution images and environmental data. Their ability to hover and maneuver with precision allows for close-up inspection of crops, detecting early signs of stress or damage by insects. This innovative application not only reduces the labor and time required for manual inspections but also provides farmers with actionable insights, enabling timely interventions and improving crop health and yield. By integrating robotic dragonflies into their farming practices, farmers can enhance the productivity and sustainability of their operations, ensuring better resource management and higher economic returns.

Figure 5:
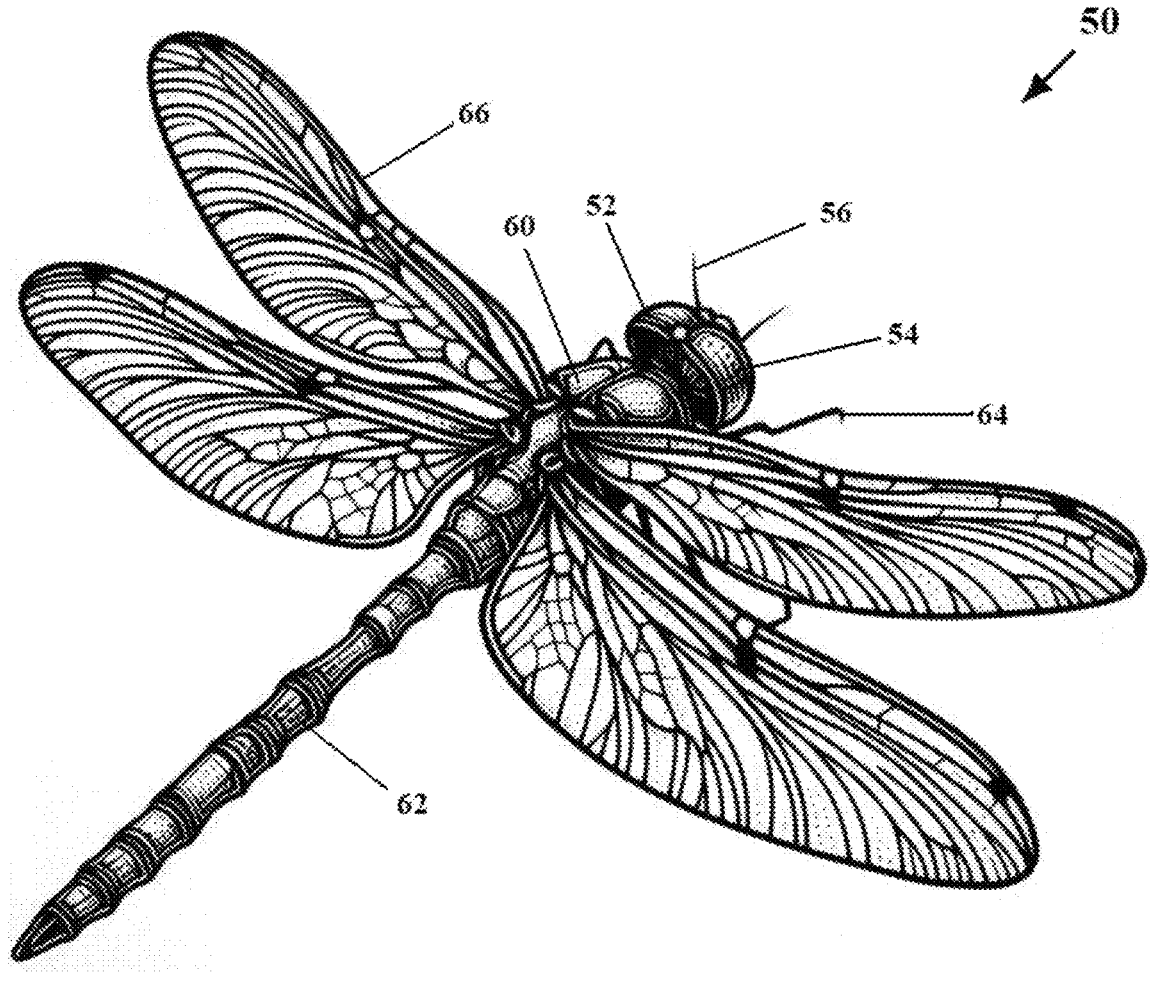
FIG. 5 is a perspective view of a dragonfly-like robot with all key components, according to an embodiment of this invention.

FIG. 5 is a perspective view of a dragonfly-like robot with all key components, according to an embodiment of this invention. The robotic dragonfly (50) comprises the following main components: A head (52), eyes (54), antenna (56), mouthparts (58), thorax (60), abdomen (62), legs (64), and wings (66). Each of these components are described in the following:

Head (52): Contains high-resolution micro cameras integrated with the eyes (54) for capturing visual data and aiding in navigation.

Antennae (56): Designed as electronic signal antennas for receiving and transmitting signals for communication.

Mouthparts (58): Used for tasks such as sampling, manipulating objects, and other specific functions.

Thorax (60) and Abdomen (62): House a small electronic circuit board with CPU, battery, and actuators for wing and leg movement.

Legs (64): Provide stability and assist in perching, landing, and other locomotion tasks.

Wings (66): Include actuators for flapping, hovering, and controlled flight, and are made of thin-film photovoltaic solar materials to harvest solar power.

These components work together to enable the robotic dragonfly to perform its intended tasks efficiently, mimicking the behavior and capabilities of real dragonfly in various agricultural and environmental scenarios.

D. Design of Guidance and Control System for Insect-Like Robots

Leveraging the advancements in large language models (LLM) and generative artificial intelligence (Gen-AI), we describe an innovative design for insect-like robots with embodied artificial intelligence. These robots are trained using extensive video, image, and text datasets to perform complex tasks autonomously. In this section, we describe how to design a guidance and control system for robotic mantis with Gen-AI. The method described here can also be used to develop guidance and control systems for robotic bees, robotic dragonflies and other insect-like robots. Therefore, a guidance and control system for robotic mantis with Gen-AI can also refer to a guidance and control system for robotic bees with Gen-AI, or a guidance and control system for robotic dragonflies with Gen-AI, or a guidance and control system for insect-like robots with Gen-AI. We use mantis as a case example because it is a more complex insect-like robot to develop with various actuators.

Figure 6:
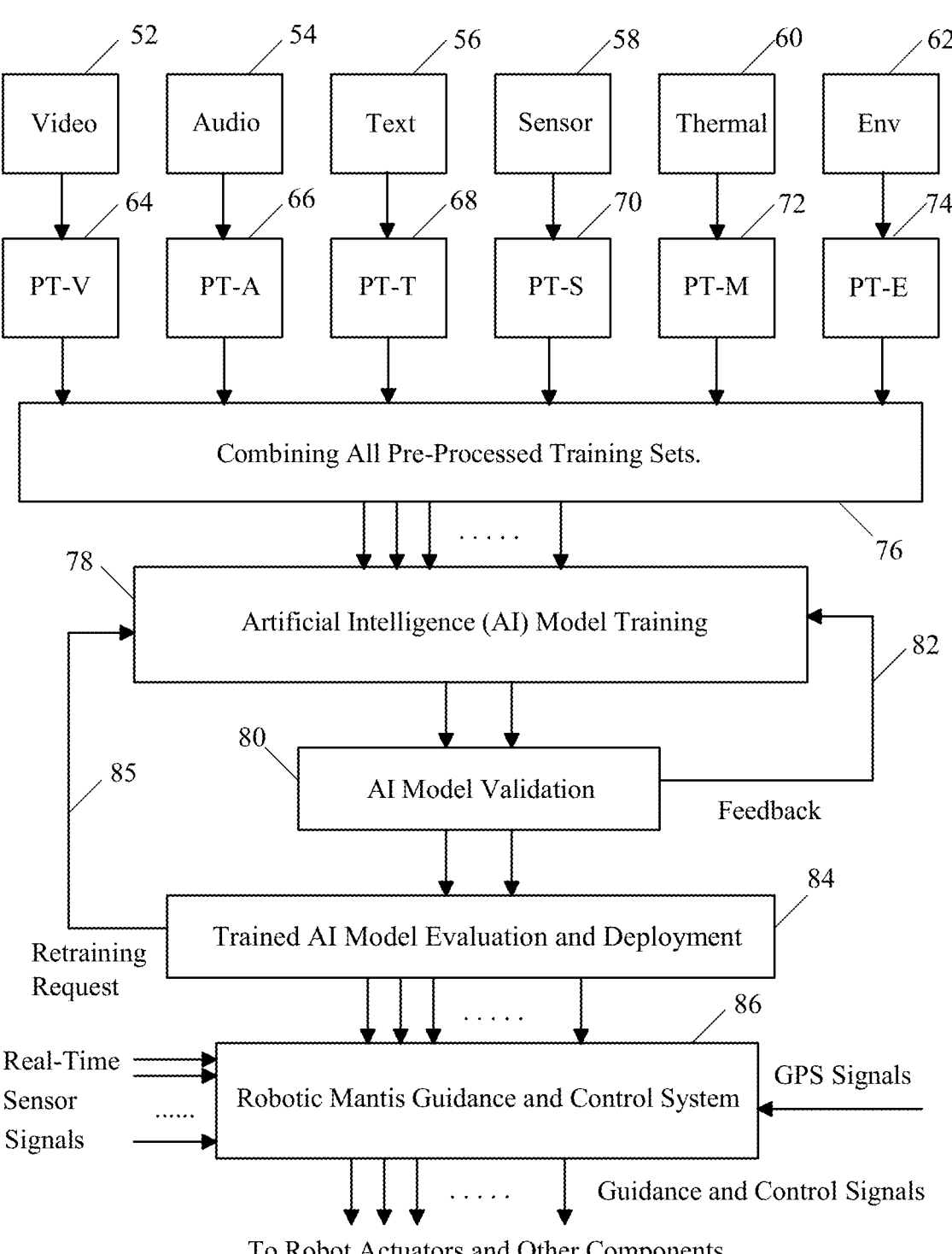
FIG. 6 is a block diagram showing the major components and workflows to develop an artificial intelligence (AI) model to be used in an insect robot guidance and control system, according to an embodiment of this invention.

FIG. 6 is a block diagram showing the major components and workflows to develop an artificial intelligence (AI) model to be used in a robotic mantis guidance and control system, according to an embodiment of this invention. The first layer comprises Video and Image Datasets (52), Audio Datasets (54), Text and Behavioral Annotation Datasets (56), Sensor Signal Datasets (58), Thermal Imaging Datasets (60), and Environmental Data Datasets (62). Each of these datasets is used to provide the following functions:

Video and Image Datasets (52): Provide visual data for training the AI model to recognize and identify various bugs and environmental features.

Audio Datasets (54): Include sound recordings to help the AI model interpret audio cues from the environment, such as the sounds of bugs.

Text and Behavioral Annotation Datasets (56): Contain descriptive and behavioral information about various bugs and their interactions, used to enhance the AI model's decision-making capabilities.

Sensor Signal Datasets (58): Comprise data from various sensors, including those for detecting movement, air pressure, and humidity, to aid in environmental awareness and navigation.

Thermal Imaging Datasets (60): Provide thermal images to train the AI model to detect and identify bugs based on their heat signatures, enabling the robotic mantis to operate effectively at night.

Environmental Data Datasets (62): Include comprehensive data on environmental conditions, such as temperature, weather patterns, and vegetation, to help the AI model adapt to different environments and optimize its performance.

These datasets work together to develop a robust AI model that enables the robotic mantis to perform complex tasks autonomously, including navigating and identifying bugs both during the day and at night using its integrated micro thermal camera.

All datasets go through a data preparation step to achieve the following goals: (i) Data Cleaning: Removing any irrelevant or noisy data to ensure high-quality inputs; (ii) Data Augmentation: Generating additional training data through techniques such as translation, cropping, or rotating images (if applicable); and (iii) Data Tokenization: Converting raw text into a format suitable for the model, such as tokens or embeddings.

The prepared datasets of video, image, audio, text, sensor, thermal, and environmental information then enter the second layer, which comprises a number of pre-training mechanisms or blocks for pre-training the datasets before they can be used for AI model training. Here, "block" refers to a mechanism that includes hardware, software, or a combination of both to perform specific functions.

Video and Image Datasets (52) enter Pre-training Block PT-V (64), Audio Datasets (54) enter Pre-training Block PT-A (66), Text Datasets (56) enter Pre-training Block PT-T (68), Sensor Datasets (58) enter Pre-training Block PT-S (70), Thermal Imaging Datasets (60) enter Pre-training Block PT-M (72), and Environmental Data Datasets (62) enter Pre-training Block PT-E (74). The pre-training process in each block is designed to clean and prepare the datasets for subsequent AI model training.

The pre-training process typically includes the following steps: (i) Model Initialization: Setting up the model with initial weights, often based on a pre-existing, pre-trained model; (ii) Training on a Large Corpus: Training the model on a large, diverse dataset to learn general language patterns and representations; and (iii) Using Transformers: Implementing transformer architectures, a type of AI neural network widely used in large language model (LLM) training, to efficiently process and generate sequences.

Block (76) combines the cleaned and pre-trained datasets from the individual pre-training blocks. This integration ensures that the datasets are synchronized and formatted appropriately for the next stage of the AI model training process.

The combined datasets then enter Blocks 78 and 80 to perform AI model training and validation. This training process starts with using a commercially available or open-source large language model (LLM) base model. Utilizing such a base model simplifies and streamlines the actual secondary model training and fine-tuning, making the entire process more efficient and manageable. Secondary model training and fine-tuning is the step of adapting the base model to specific tasks by further training it on task-specific datasets. This involves adjusting the model's weights and hyperparameters to optimize its performance for the desired applications.

Neural network weights are the parameters within the model that are adjusted during training to minimize the error in predictions. They determine the strength of the connection between neurons in different layers of the network. Hyperparameters, on the other hand, are the settings that define the overall structure and behavior of the model, such as learning rate, batch size, and the number of layers. These are set before training begins and can significantly impact the model's performance and training efficiency.

The secondary AI model training, fine-tuning, and validation may require substantial computing power and time, involving multiple recurring steps until the model training can be considered complete based on certain model convergence and validation criteria. These steps typically include the following: (i) Task-Specific Training: Training the pre-trained model on a specific dataset tailored to the desired application (e.g., classification, translation); (ii) Adjusting Hyperparameters: Tweaking learning rates, batch sizes, and other parameters to optimize performance for the specific task; and (iii) Validation: Continuously validating the model on a separate validation set to monitor performance and prevent overfitting.

Overfitting means that the model learns the training data too well, including noise and minor details, which negatively impacts its performance on new unseen data. It results in a model that performs well on the training data but poorly on validation or test data, indicating that it has not generalized well to new situations.

During the Validation (80) step, feedback information is sent back through Step (82) to maintain a continuous relationship between the AI Model Training block (78) and the AI Model Validation block (80). This iterative process ensures that the model training continues until it meets the required model convergence and validation criteria, ensuring robust and accurate performance.

After the AI model is validated, it enters Block 84 for model evaluation and deployment. The evaluation may include: (i) Performance Metrics: Assessing the model using metrics like accuracy, precision, recall, F1 score, and loss to evaluate its effectiveness. The F1 score is a measure of a model's accuracy that considers both precision (the number of true positive results divided by the number of all positive results, including those not identified correctly) and recall (the number of true positive results divided by the number of positives that should have been identified). It is the harmonic mean of precision and recall, providing a single metric that balances both concerns; and (ii) Error Analysis: Analyzing errors and misclassifications to understand model weaknesses and areas for improvement.

The deployment should include: (i) Model Optimization: Compressing and optimizing the model for faster inference and lower resource usage through techniques such as pruning and quantization. Pruning involves removing less important weights in the neural network to reduce its size and complexity, while quantization reduces the precision of the numbers used to represent the model's parameters, making the model smaller and faster without significantly affecting performance; (ii) Integration: Integrating the model into the target application or system to ensure it functions correctly in the intended environment; and (iii) Monitoring and Maintenance: Continuously monitoring the model's performance in real-world scenarios and retraining or updating as necessary to maintain and improve performance. The request for model retraining or updating is shown in Block 85, ensuring that the model remains effective and up-to-date.

All of the steps from gathering datasets to AI model training, validation, and deployment that can be used in this embodiment are any of the known techniques described in the book, "Large Language Models in Action: Design, Build, and Deploy Intelligent LLM Applications" by Liam Sturgis, independently published in April 2024, wherein the book and its contents are herein expressly incorporated by reference in their entirety. All software programs, AI models, and control algorithms are executed using computing processing units (CPU). The term "computing processing unit" or "CPU" means a microprocessor, microcontroller, microcontrol unit, or any integrated circuit capable of performing computation and executing software programs and control algorithms.

Figure 7:
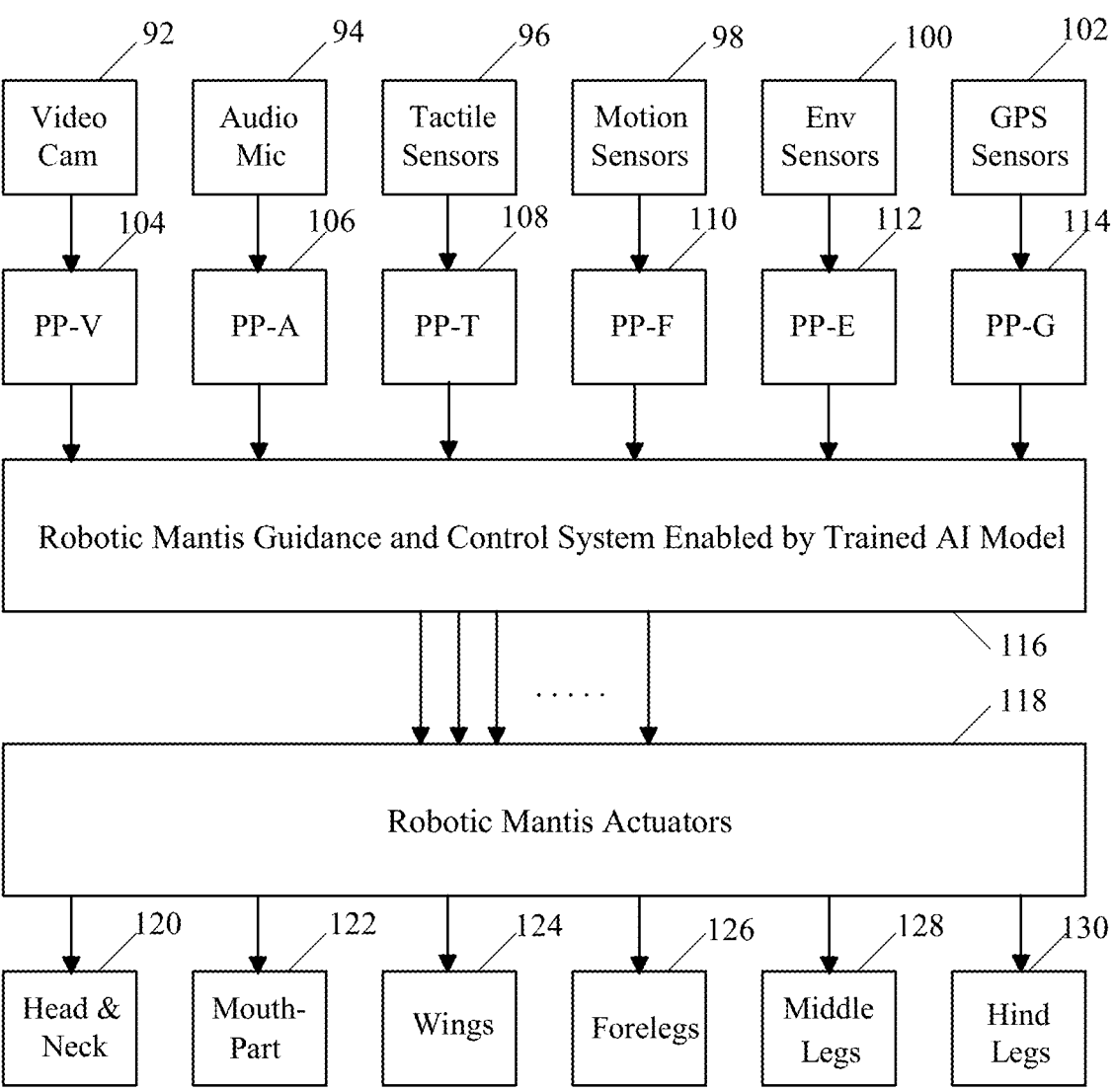
FIG. 7 is a block diagram showing the major components, including sensors, control system, actuators, and signal flows of an insect robot guidance and control system enabled by a trained AI model, according to an embodiment of this invention.

The trained AI model will be integrated with the Robotic Mantis Guidance and Control System (86) to be described in FIG. 7.

FIG. 7 is a block diagram showing the major components, including sensors, control system, actuators, and signal flows of a robotic mantis guidance and control system enabled by a trained AI model, according to an embodiment of this invention.

A guidance and control system for a robotic mantis is a sophisticated mechanism that directs the robot's movements and actions in real-time. The guidance part involves determining the optimal path and actions for the robot based on inputs from various sensors, such as video cameras, audio microphones, and GPS sensors. This includes processing environmental data to navigate obstacles, adjust motion paths, and execute specific tasks. The control part translates these guidance decisions into precise commands for the actuators, ensuring smooth and accurate movements of the robot's head, legs, wings, and other parts. Together, this system enables the robotic mantis to perform complex tasks autonomously and efficiently.

On the first layer of the Robotic Mantis Guidance and Control System, it comprises Video Cameras (92), Audio Microphones (94), Tactile Sensors (96), Motion Sensors (98), Environmental Sensors (100), and GPS Sensors (102). The purpose of using these sensors are described in the following:

Video Cameras (92): Capture high-resolution visual data to aid in navigation, target identification, and environmental awareness.

Audio Microphones (94): Detect and analyze environmental sounds, aiding in identifying prey and understanding surrounding conditions.

Tactile Sensors (96): Measure pressure and touch, enabling the robotic mantis to interact with objects and surfaces in its environment.

Motion Sensors (98): Detect movement and orientation, including thermal sensors to detect heat signatures of prey and other objects, helping to maintain stability and coordinate precise movements.

Environmental Sensors (100): Monitor temperature, humidity, and other environmental conditions to adjust behavior and optimize performance.

GPS Sensors (102): Provide location data for accurate navigation and positioning within the operational area.

These sensors work together to provide comprehensive input to the guidance and control system, enabling the robotic mantis to perform its tasks efficiently and autonomously. Each of these sensors may include specialized micro-size hardware and software to process the collected data effectively.

The signals from video cameras (92), audio microphones (94), tactile sensors (96), motion sensors (98), environmental sensors (100), and GPS sensors (102) then enter the second layer of the system. This layer comprises signal pre-processing mechanisms for signal cleanup and validation before they can be used for guidance and control.

As shown in FIG. 7, Video signals (92) enter Preprocessing Block PP-V (104); Audio signals (94) enter Preprocessing Block PP-A (106); Tactile signals (96) enter Preprocessing Block PP-T (108); Motion sensor signals (98) enter Preprocessing Block PP-F (110); Environmental sensor signals (100) enter Preprocessing Block PP-E (112); GPS sensor signals (102) enter Preprocessing Block PP-G (114). Each preprocessing block is responsible for cleaning and validating the respective signals to ensure they are accurate and reliable for the subsequent guidance and control processes.

The output of each preprocessing block then enters the Robotic Mantis Guidance and Control System Enabled by Trained AI Model (116) as input signals. This system produces output signals based on guidance and control algorithms in real-time to manipulate the Robotic Mantis Actuators (118). These actuators guide and control the motions of various parts of the robotic mantis, including: Head and Neck Actuators (120), Mouthpart Actuators (122), Wing Actuators (124), Raptorial Foreleg Actuators (126), Middle Leg Actuators (128), and Hind Leg Actuators (130). Each of these actuators are described in the following:

Head and Neck Actuators (120): Allow precise movements of the head for improved visual and sensory data collection, enabling better targeting and interaction with the environment.

Mouthpart Actuators (122): Operate the mouthparts for tasks such as capturing and manipulating prey, collecting samples, and other specific functions.

Wing Actuators (124): Enable flapping, hovering, and controlled flight, allowing the mantis to navigate through its environment and reach elevated areas.

Raptorial Foreleg Actuators (126): Control the powerful and precise movements of the forelegs, enabling the mantis to grasp and kill bugs and other prey.

Middle Leg Actuators (128): Provide stability and assist in walking, climbing, and maintaining balance during movement and when the mantis is stationary.

Hind Leg Actuators (130): Facilitate movement, jumping, and anchoring the robot for stability during complex maneuvers.

These actuators enable the robotic mantis to perform a wide range of tasks, from hunting and capturing prey to navigating and interacting with its environment, making it a versatile tool for agricultural and environmental applications.

E. Design Considerations for Insect-Like Robots

Due to the size of the robotic mantis, micro size actuators with special materials are required to build the robotic mantis. Examples of such micro actuators include:

Piezoelectric Actuators: Use materials that deform when an electric voltage is applied, allowing precise and rapid movements suitable for small-scale applications.

Shape Memory Alloys (SMA): Materials that can return to a pre-defined shape when heated, providing powerful actuation in a compact form.

Electroactive Polymers (EAP): Polymers that change shape or size when stimulated by an electric field, offering flexibility and versatility for various movements.

Micro Hydraulic Actuators: Utilize fluid power at a micro scale to achieve high force and precision, ideal for complex maneuvers.

Magnetic Shape Memory Alloys (MSMA): Materials that change shape in response to a magnetic field, allowing for precise and responsive actuation in micro-scale devices.

These advanced materials and technologies enable the construction of micro-size actuators that are essential for the robotic mantis to perform its wide range of tasks effectively.

For the robotic bees, robotic mantises, and robotic dragonflies described in Sections A, B, and C, no external battery charging function is designed in for the following reasons: (i) these insect-like robots have limited size, so incorporating extra components could complicate implementation; (ii) the solar energy harvested by the thin-film solar materials on the wings is sufficient to charge the internal battery effectively; and (iii) the guidance and control system includes a battery level monitoring function. If the battery level becomes too low, the robot will be guided to land with its wings open to charge the battery until it reaches an adequate charge level.

These insect-like robots can be controlled remotely by the user. By sending a signal, users can dispatch the robots to the field for specific tasks or missions. This remote control capability allows for flexible deployment and targeted interventions, enabling farmers and environmentalists to respond quickly to emerging issues or to perform scheduled tasks with precision. Whether it's pollinating crops, controlling pests, or inspecting farmland, the ability to remotely control these robots enhances their versatility and effectiveness.

Furthermore, the robots can be called back to a designated "nest" or base station when not in use. This nest serves as a central hub where the robots can be securely stored, monitored, and maintained. The nest provides a safe place for the robots to return for recharging, updates, or simply to rest between tasks. This feature ensures that the robots are always ready for deployment, maximizing their operational efficiency and lifespan.

F. Conclusion

The motivation to develop robotic bees, robotic mantises, robotic dragonflies and an insect-like robot empowered by generative artificial intelligence (Gen-AI) fits the mega-trend of the 4th Industrial Revolution, where everything will be smart. The development of robotic bees, mantises, and dragonflies represents a significant advancement in agricultural and environmental technology. These insect-like robots are designed to address critical challenges faced by modern agriculture, including pollination deficits, pest control, and comprehensive environmental monitoring. By leveraging cutting-edge artificial intelligence, advanced sensors, and micro-actuator technologies, these robots can perform complex tasks with precision and efficiency.

Robotic bees can autonomously pollinate crops, reducing the reliance on dwindling bee populations and enhancing crop yields. Robotic mantises offer an environmentally friendly solution for pest control, effectively targeting and eliminating harmful insects without the use of chemical pesticides. Robotic dragonflies provide essential insights into crop health and environmental conditions through detailed inspections, helping farmers make informed decisions to optimize their practices.

Our innovative approach aims to integrate these robotic systems into sustainable farming practices, ensuring higher productivity and ecological balance. By addressing key agricultural challenges with advanced robotics, we strive to support the global demand for food security and promote environmentally sustainable practices, ultimately contributing to a healthier planet.

The applicant of this patent has many years of experience in technology innovation in industrial automation, renewable energy, and artificial intelligence. Our goal is to contribute to the exciting technology transformation enabled by generative artificial intelligence in various applications that can make a significant impact on our society and the world.

The invention claimed is:

1. An insect-like robot comprising:
   a) a body comprising:
      (i) a head;
      (ii) a plurality of eyes;
      (iii) a body structure to house or connect robot components;
      (iv) a plurality of wings; and
      (v) a plurality of legs;

b) a plurality of sensors configured to capture environmental data, including at least one video camera and at least one flight sensor;
   c) a power supply;
   d) a guidance and control system comprising a trained artificial intelligence (AI) model, wherein the guidance and control system is configured to process the environmental data captured by the sensors and generate control signals; and
   e) a plurality of actuators responsive to the control signals generated by the guidance and control system, wherein the actuators are configured to manipulate at least the wings and legs to perform autonomous flight and task execution.

2. The insect-like robot of claim 1, wherein the plurality of eyes comprises at least one camera and one infrared sensor.

3. The insect-like robot of claim 1, further comprises a plurality of antennae.

4. The insect-like robot of claim 1, further comprising a wireless communication module configured to transmit data captured by the sensors to a remote monitoring station and receive commands from the station.

5. The insect-like robot of claim 1, wherein the plurality of sensors further comprises environmental sensors configured to measure temperature, humidity, and air quality.

6. The insect-like robot of claim 1, wherein the guidance and control system comprises a navigation module configured to use GPS signals for determining a location and flight path of the robot.

7. The insect-like robot of claim 1, wherein the power supply comprises a battery and the wings comprise photovoltaic solar materials to harvest solar power.

8. The insect-like robot of claim 1, wherein the insect-like robot is a bee-like robot.

9. The insect-like robot of claim 1, wherein the insect-like robot is a mantis-like robot.

10. The insect-like robot of claim 1, wherein the insect-like robot is a dragonfly-like robot.

11. A guidance and control system for an insect-like robot, comprising:
   a) a plurality of sensors configured to capture environmental data, the sensors comprising at least one video camera and at least one flight sensor;
   b) a trained artificial intelligence (AI) model configured to process the environmental data captured by the sensors and provide robot flight and motion guidance;
   c) a computing processing unit configured to execute the AI model, control algorithms, and provide guidance commands and control signals; and
   d) a plurality of actuators responsive to the control signals, wherein the actuators are configured to manipulate parts of the insect-like robot to perform autonomous flight and task execution.

12. The guidance and control system of claim 11, wherein the system is configured to perform obstacle detection and avoidance using the environmental data from the sensors.

13. The guidance and control system of claim 11, wherein the plurality of sensors further comprise environmental sensors configured to measure temperature, humidity, and air quality.

14. The guidance and control system of claim 11, wherein the AI model is further configured to optimize flight paths based on real-time environmental data.

15. The guidance and control system of claim 11, further comprising a wireless communication module configured to transmit data to, and receive data from, a remote monitoring station.

16. A method of autonomously operating an insect-like robot, comprising steps of:

a) capturing environmental data using a plurality of sensors, the sensors comprising at least one video camera and at least one flight sensor;

b) processing the captured environmental data using a trained artificial intelligence (AI) model and a control system to generate guidance and control signals; and c) manipulating parts of the insect-like robot, including wings and legs, using a plurality of actuators in response to the guidance and control signals to perform autonomous flight and task execution.

17. The method of claim 16, further comprising a step of performing obstacle detection and avoidance using the environmental data captured by the sensors to ensure safe navigation of the insect-like robot.

18. The method of claim 16, further comprising a step of charging a battery of the insect-like robot using photovoltaic solar materials of the wings to harvest solar power.

19. The method of claim 16, further comprising a step of dispatching the insect-like robot to a designated location to perform specific tasks.

20. The method of claim 16, further comprising a step of recalling the insect-like robot to fly back to a designated base station.

\* \* \* \* \*